(12) United States Patent
Whitten

(10) Patent No.: US 7,792,491 B2
(45) Date of Patent: Sep. 7, 2010

(54) WIRELESS PRINTING USING A MOBILE COMPUTING DEVICE

(76) Inventor: Matthew Robert Whitten, P.O. Box 998, Gray, ME (US) 04039

( * ) Notice: Subject to any disclaimer, the term of this patent is extended or adjusted under 35 U.S.C. 154(b) by 853 days.

(21) Appl. No.: 11/582,742

(22) Filed: Oct. 18, 2006

(65) Prior Publication Data

US 2008/0096486 A1 Apr. 24, 2008

(51) Int. Cl.
*H04B 7/00* (2006.01)
*G06F 3/12* (2006.01)
*G06Q 30/00* (2006.01)
*G06Q 20/00* (2006.01)

(52) U.S. Cl. .............. 455/66.1; 358/1.15; 709/217; 705/14.1; 705/75; 705/77

(58) Field of Classification Search .............. 455/41.2, 455/557, 405; 705/14, 21; 358/1.15
See application file for complete search history.

(56) References Cited

U.S. PATENT DOCUMENTS

| | | | | |
|---|---|---|---|---|
| 6,856,820 B1 * | 2/2005 | Kolls | ............ | 455/575.9 |
| 7,113,300 B2 * | 9/2006 | Strobel et al. | ............ | 358/1.15 |
| 7,409,434 B2 * | 8/2008 | Lamming et al. | ............ | 709/217 |
| 2002/0063885 A1 * | 5/2002 | Dutta | ............ | 358/1.15 |
| 2002/0065101 A1 | 5/2002 | Picoult et al. | | |
| 2002/0169002 A1 | 11/2002 | Imbrie et al. | | |
| 2003/0003957 A1 | 1/2003 | Berkema et al. | | |
| 2003/0101095 A1 * | 5/2003 | Suzuki | ............ | 705/14 |
| 2003/0105643 A1 | 6/2003 | Chen et al. | | |
| 2004/0015396 A1 * | 1/2004 | Satomi et al. | ............ | 705/14 |
| 2004/0133525 A1 | 7/2004 | Singh et al. | | |
| 2004/0143549 A1 | 7/2004 | Likourezos | | |
| 2004/0177000 A1 * | 9/2004 | Takamine | ............ | 705/14 |
| 2004/0184100 A1 | 9/2004 | Shahindoust | | |
| 2005/0044479 A1 | 2/2005 | Willams et al. | | |

OTHER PUBLICATIONS

Valpak web site as of Jan. 22, 2005 located at http://web.archive.org/web/20050122035046/www.valpak.com/vpcol/home.do.*

* cited by examiner

*Primary Examiner*—Matthew D Anderson
*Assistant Examiner*—Gennadiy Tsvey
(74) *Attorney, Agent, or Firm*—Preti Flaherty Beliveau & Pachios LLP

(57) ABSTRACT

A method and system for using a mobile computing device to wirelessly print data includes establishing a first wireless link with a printer system and establishing a second wireless link with a central computer system. User account data is transmitted to the central computer system via the second wireless link for verification. Upon verification, a mobile print package is generated and transmitted to the printer system via the first wireless link for printing. Depending on the level of service selected by the user, advertisement content can be included in the mobile print package.

20 Claims, 9 Drawing Sheets

WIRELESS PRINTING USING A MOBILE COMPUTING DEVICE

BACKGROUND OF THE INVENTION

The ability to print, or more generally the ability to mass produce information in a paper format has been the backbone for one's ability to process, utilize, and archive knowledge ever since even before the introduction of the printing press. The typewriter was one of the first mass produced machines to produce a typed document of a user's thoughts. As technology improved, the mimeograph allowed for the rapid reproduction of a printed page through the use of powderized ink and template documents. The result was adequate, although the process was messy and less than ideal. Photocopiers, along with the rise of the personal computer and related printing systems, allowed for a less expensive and more precise printing method for the masses; however, the ability to mass produce information into a paper format from digital sources was cumbersome and limited to owners of expensive equipment.

With the commoditization of personal computing hardware and software throughout the last decade, users defied the predictions of a paperless office. People just seem to have a better grasp of information if they can read, comment-on, and otherwise mark-up physical documents as opposed to processing the information on a digital display. In a typical wired environment, such as a modern office or home environment, either a single computer or a network of computers are attached to a printer through the wired network. From there, the user can simply issue a print command, go to the network printer, pick up the document, and use it as desired.

The advent of wireless communication technologies has given rise to a host of mobile computing devices, such as laptops, personnel digital assistants, text messaging devices, etc., which are used for an increasing amount of functions which a personal computer of the late 1990's would have typically been used for most of the time. From the first laptop computers, users wishing to have their documents printed would have to hook up to a local printer, install print drivers, etc. or connect to a preexisting network printer, somewhere in the world, to print the document out on a recognized network printer. This approach can be time-consuming and frustrating and is often simply impractical.

Accordingly, it would be desirable to be able to more easily print data from mobile computing devices.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
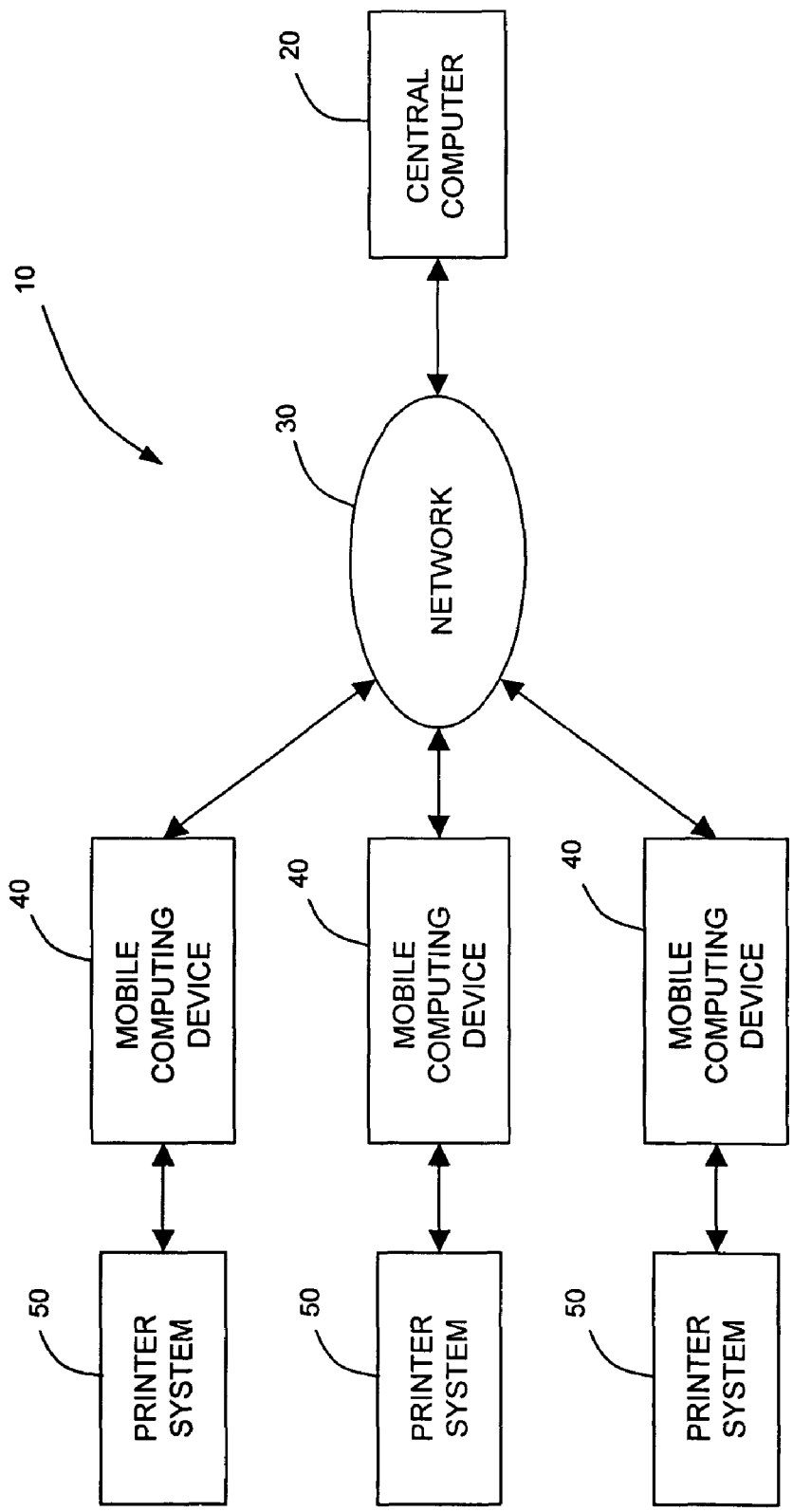
FIG. 1 is a block diagram depicting one embodiment of a wireless printing system.

Referring to the drawings wherein identical reference numerals denote the same elements throughout the various views, FIG. 1 shows a computer-based system 10 for enabling users of mobile computing devices to wirelessly print data at various locations. The system 10 includes at least one central computer 20 that interacts with one or more mobile computing devices 40 operated by various users. The system 10 further includes one or more printer systems 50 that also interact with the mobile computing devices 40. The mobile computing devices 40 are able to interact with the central computer 20 via a network 30. The network 30 can be any suitable type of network, such as a local area network or a wide area network, and is typically the Internet. The mobile computing devices 40 interact with respective printer systems 50 via a wireless communication link. Although there will typically be more mobile computing devices than printer systems, it should be noted that the system 10 can include any number of mobile computing devices 40 and any number of printer systems 50, and that any one of the mobile computing devices 40 can interact with any one of the printer systems 50. Furthermore, each printer system 50 can interact with more than one of the mobile computing devices 40 at a given time (as long as the mobile computing devices 40 are in range of the particular printer system 50). Generally, the printer systems 50 are located in a number of discrete, dispersed physical locations and can be distributed on a regional, national or even global basis so as to provide users of the mobile computing devices 40 a wide range of locations from which to utilize the printing service provided by the system 10. These printer systems 50 would preferably be serviced and maintained by onsite technicians.

The central computer 20 (which can be a single computer or a series of connected computers) provides a number of functions. As will be described in more detail below, the central computer 20 provides business accounting and user support coordination back-office services to facilitate the wireless printing service. The central computer 20 can also provide a database of geo-spatial based advertisement data or content that can be used to insert into a print job advertising that is localized based on the location of the mobile computing device 40 and/or the printer system 50.

When a user of a mobile computing device wishes to utilize the wireless printing service, he or she operates the mobile computing device 40 to connect with a suitable printer system 50 (i.e., a printer system that the mobile computing device 40 is in range of). The mobile computing device 40 also connects to the central computer 20 via the network 30. As such, the mobile computing device 40 is able to function as a communication interface between the printer system 50 and the central computer 20. Once the user initiates a print request, the wireless printing system 10 securely accounts for and records all transmission details, including the packaging of localized advertisement content with the user's print request before producing a paper copy of the final document at the wireless printer system 50.

Figure 2:
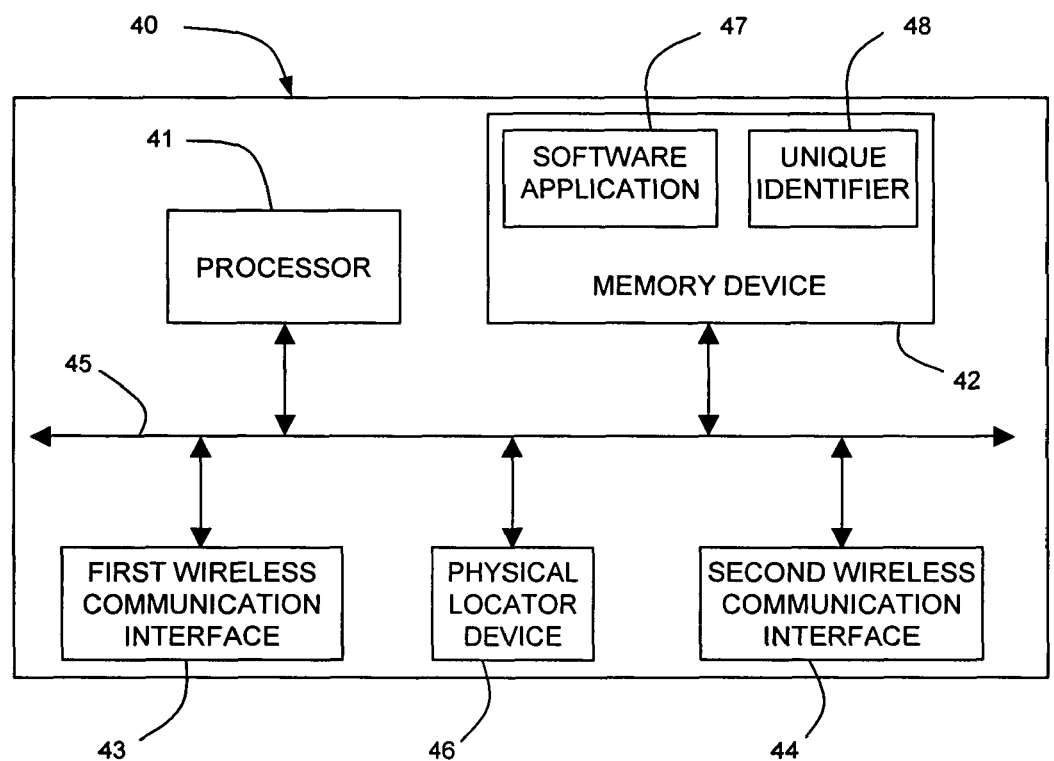
FIG. 2 is a block diagram depicting one embodiment of a mobile computing device from the wireless printing system.

Referring to FIG. 2, one possible architecture of a mobile computing device 40 is depicted. As used herein, the term "mobile computing device" refers to any type of computing device that is capable of being, or is intended to be, transportable. This includes, but is not limited to, laptops, tablet PCs, cell phones, smart phones, personal digital assistants (PDAs), wireless e-mail devices, and other handheld devices. In the illustrated embodiment, the mobile computing device 40 includes a processor 41, a memory device 42, a first wireless communication interface 43, and a second wireless communication interface 44 all connected by a system bus 45. The system bus 45 may be any of several types of bus structures and may actually comprise multiple bus structures interconnected by various bridges, adapters and/or controllers. Also included is a physical locator device 46, which produces an indication of the location (e.g., longitude and latitude) of the mobile computing device 40. The physical locator device 46 can be a GPS unit, or can utilize other types of geo-location techniques such as triangulation or multilateration. Furthermore, the physical locator device 46 can be either an internal component of the mobile computing device 40 or an external peripheral device connected to the mobile computing device 40.

The first wireless communication interface 43 enables the mobile computing device 40 to wirelessly send and receive digital data to and from the printer system 50. The first wireless communication interface 43 can employ any form of wireless connectivity, but preferably utilizes a short-range radio transmission protocol such as Bluetooth. The second wireless communication interface 44 allows the mobile computing device 40 to wirelessly connect to the network 30 and thereby send and receive digital data to and from the central computer 20. The second wireless communication interface 44 can also employ any form of wireless connectivity, but will typically comprise an 802.11(b/g) standard and/or cellular network connection. The two wireless communication interfaces 43 and 44 make the mobile computing device 40 capable of at least two simultaneous forms of wireless data transmission.

The memory device 42 contains a wireless printing software application 47 that causes the mobile computing device 40 to engage the central computer 20 and one of the printer systems 50 to print a data stream originating from the mobile computing device 40. The memory device 42 also contains a unique identifier 48, such as an Electronic Serial Number (ESN), that uniquely identifies the mobile computing device 40 and distinguishes it from other mobile computing devices. The memory device 42 can comprise ROM, RAM, a storage device, or any combination thereof.

With any implementation, the wireless printing software application 47 can be loaded into the mobile computing device 40 via a removable computer readable medium (such as a floppy disk, CD-ROM or the like) inserted into the appropriate drive of the mobile computing device 40 and accessed from there. Alternatively, the software application 47 could be accessed from the removable computer readable medium inserted into the appropriate drive. The software application 47 could also be alternatively accessed via the Internet or another computer network. As used herein, the term "computer-readable medium" refers generally to any medium from which stored data can be read by a computer or similar unit. This includes not only removable media such as the aforementioned floppy disk and CD-ROM, but also non-removable media such as a hard disk or integrated circuit memory device.

When initiating a print request, the user of the mobile computing device 40 selects a digital data stream to be printed. As will be described in more detail below, the software application 47 uses the data stream and, depending on the level of service selected by the user, geospatial information from the physical locator device 46 to prepare a data package, referred to hereinafter as the mobile print package, for delivery to the printer system 50 via the first wireless communication interface 43. The mobile computing device 40 can also receive data from the printer system 50 via the first wireless communication interface 43. By way of example, the mobile computing device 40 could receive print status messages from the printer system 50. Such messages could include, but are not limited to, a notification that the print job was successfully completed, a notification that the printer has a paper jam, and a notification that the printer is out of paper. Where appropriate, the mobile computing device 40 can forward the messages to the central computer 20. The mobile computing device 40 could also forward accounting information for the user and advertisers to the central computer 20.

Figure 3:
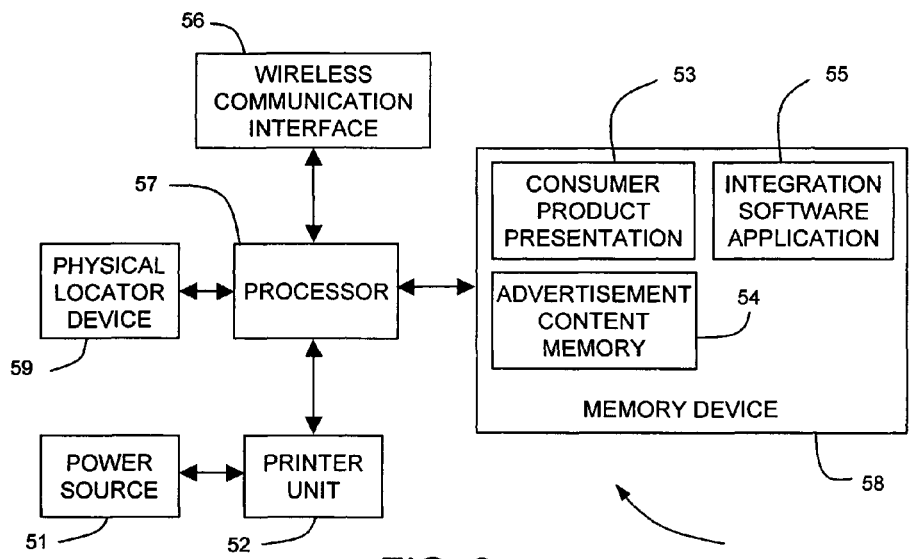
FIG. 3 is a block diagram depicting one embodiment of a printer system from the wireless printing system.

Referring to FIG. 3, each printer system 50 generally includes a power source 51, a printer unit 52, a wireless communication interface 56, a processor 57, and a memory device 58. The power source 51 is typically a standard AC outlet accessed with an ordinary electrical power cord. In which case, the electrical power cord is the only wired connection from the printer system 50 to the installation location. It should be noted that each printer system 50 could also be provided with a physical locator device 59 that can be used in lieu of, or in conjunction with, the physical locator device 46 of the mobile computing device 40. The memory device 58 includes a consumer product presentation layer 53, an advertisement content memory 54, and an integration software application 55. In one possible embodiment, the printer systems 50 can be set up in a kiosk arrangement and located in public or semi-public settings such as coffee shops, libraries, print shops, hotels, airports, train stations, and the like.

The printer system 50 receives the above-mentioned data package from the mobile computing device 40 via its wireless communication interface 56. The integration software application 55, which coordinates the print job, unpacks the data package into its original data components, as well as interfaces with the advertisement content memory 54 and the consumer product presentation layer 53. The advertisement content memory 54 contains a geographical area advertisement content database that is queried utilizing the geographical information provided by both the physical locator device 46 and advertisement information contained in the integration software application 55. The consumer product presentation layer 53 then combines the localized advertisement content with the user data stream to prepare a digital representation of the digital document that the printer unit 52 utilizes to produce the printed output. The content of the advertisement content memory 54 can be periodically updated onsite. A generic template could be established for advertisers to upload their ads to a website maintained by the wireless service provider which would then be updated to individual printer systems via either streaming the content through one or more mobile computing devices during a print job or by sending a technician to each printer system and manually updating the advertisement content memory 54.

Figure 4:
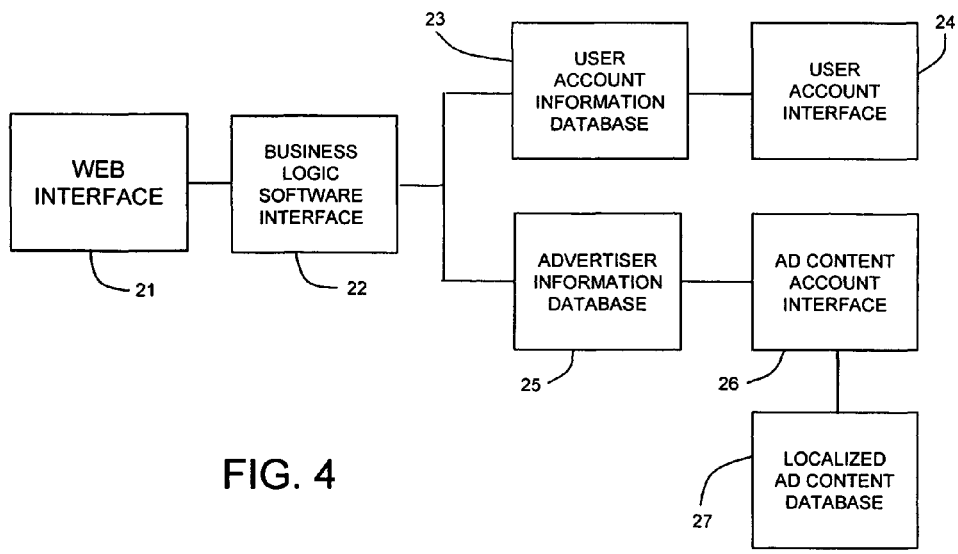
FIG. 4 is a block diagram depicting one embodiment of a central computer from the wireless printing system.

Referring to FIG. 4, the central computer 20 has a software package that includes a web interface 21, a business logic software interface 22, a user account information database 23, a user account interface 24, an advertiser information database 25, an advertisement content account interface 26, and a localized advertisement content database 27. The user account interface 24 communicates with the mobile computing device 40 via the second wireless communication interface 44 to send and receive user account information used to bill and/or account for usage by individual users. Information handled includes, but is not limited to username, password, unique identifier 48, user print credits, along with any other necessary data fields required to generate an electronic transaction receipt for future user email or download. The user account information database 23 contains additional user information (e.g., address, credit card number, electronic payment system account number, etc.) that is utilized by the wireless printing system 10 to provide accounting for the service. Information from the user account interface 24 is used by the business logic software interface 22 to access the user account information database 23 and verify user and device identity, confirm payment methods, store additional user information, and archive transaction activities.

The advertisement account interface 26 interfaces with the advertiser information database 25 to provide business and accounting information which the business logic software interface 22 utilizes to properly provide dynamic advertisement information to the wireless printer system 50 as it prepares the paper output that is generated by the printer unit 52. The transaction, billing, and service details between the central computer 20 and the advertisers of the service are contained in the advertiser information database 25. This enables the service provider to track how many advertisements have been placed and how much to bill the various advertisers. The localized advertisement content database 27 contains a repository of geo-spatial advertisement data, which can be used in place of, or to supplement, the data of the advertisement content memory 54. The data contained in the localized advertisement content database 27 is accessed through the advertisement account interface 26 and the mobile computing device 40 to communicate relevant advertisement content information to the wireless printing software application 47, which is then forwarded to the consumer product presentation layer 53 when preparing an output document. The content of the localized advertisement content database 27 can be directly supplied by external advertisers via the web interface 21. Alternatively, the wireless printing service provider can input advertisement content. The web interface 21 can also be utilized by users and advertisers to sign-up for, modify, query, and interact with the wireless printing system 10.

Figure 5:
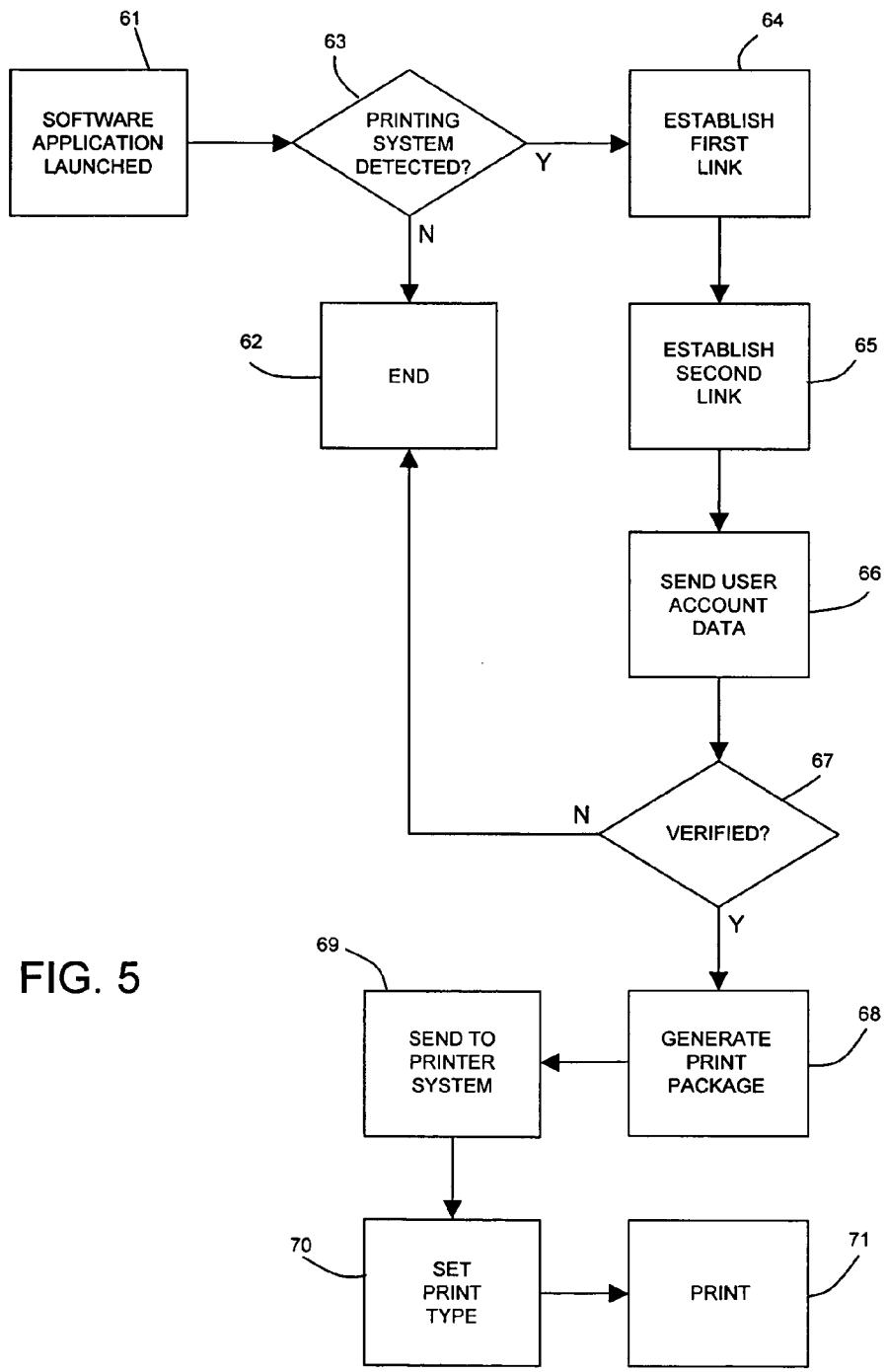
FIG. 5 is a flow chart representing one method for utilizing the wireless printing system.

The user interacts with the wireless printing system 10 through a specific predefined transaction process. Referring to FIG. 5, a transaction cycle is initiated when a user of a mobile computing device 40 launches the wireless printing software application 47, as shown at block 61. The software application 47 then utilizes the first wireless communication interface 43 to determine if a printer system 50 is detected at block 63. If a printer system 50 is not detected, the software application 47 shuts down at block 62, and the user is informed of the shutdown via a dialog box that the software application 47 originates.

If a printer system 50 is detected, then a secure short-range wireless data transmission link, such as a Bluetooth connection, is established, at block 64, between the mobile computing device 40 and the printer system 50 using the first wireless communication interface 43 and the printer system's wireless communication interface 56. After verifying the short-range wireless connection exists, the software application 47 establishes a secure wireless connection with the central computer 20 via the second wireless communication interface 44 at block 65. After verifying that a secure connection is established, the software application 47 queries the user for identity verification via standard web-based forms of identification, such as username/email, password, security questions (such as mother's maiden name and pet's date of birth), etc.

Next, at block 66, the software application 47 transmits the user account information to the central computer 20 for user account verification.

At block 67, the central computer 20 uses the supplied user account information to determine whether the user has a valid account. If the central computer 20 ultimately fails to authenticate/recognize the submitted user account information, the software application 47 shuts down, at block 62, and the transaction ends with notification to the user of the shutdown via a dialog box. If the user account is verified at block 67, then the software application 47 generates a mobile print package at block 68. Next, at block 69, the software application 47 sends the mobile print package to the wireless printer system 50 for initiation of the print job and printing of the final consumer document. The printer system 50 unpacks the mobile print package into its component form, and then the consumer product presentation layer 53 and the integration software application 55 set the user content and the localized advertisement content, if applicable, into a type suitable for printer output at block 70. From there, the printer system 50 prints the requested data stream at block 71 to produce the user's paper copy of the data stream, thereby completing the transaction cycle.

Figure 6:
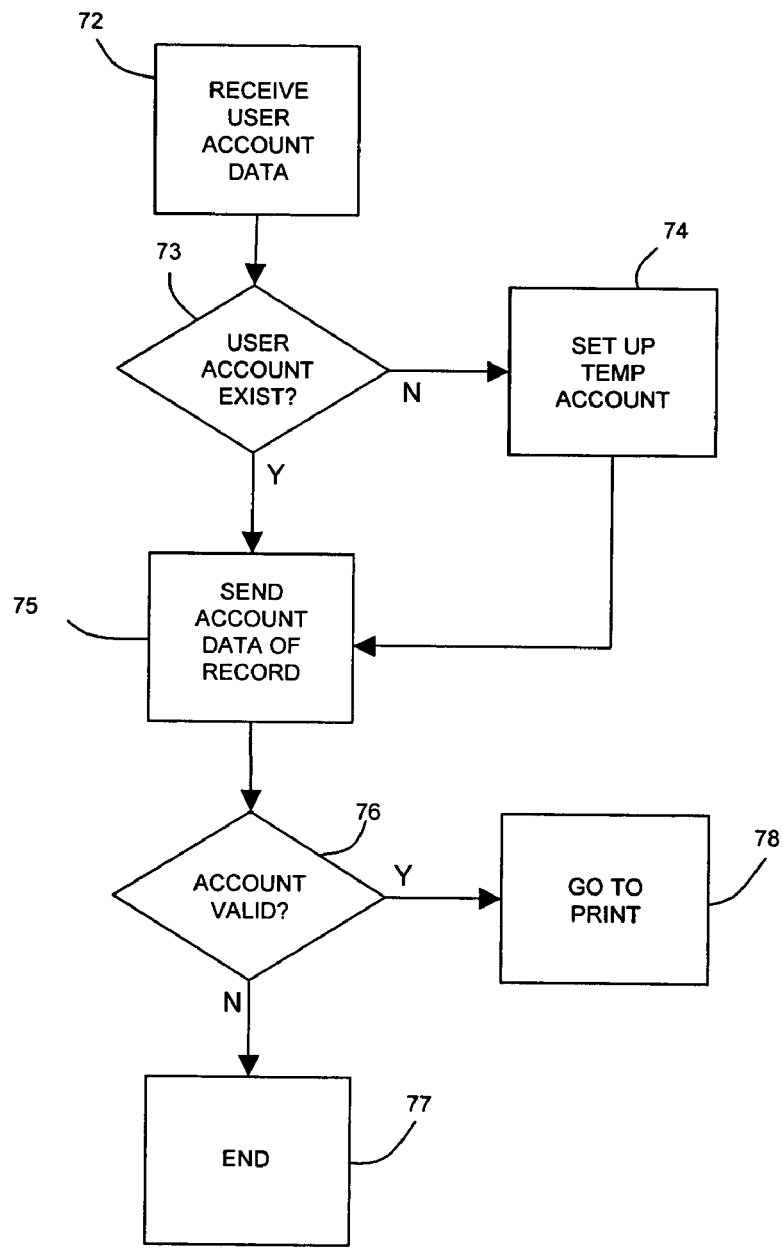
FIG. 6 is a flow chart representing a process for verifying the user account data.

Referring to FIG. 6, one process of verifying the user account data (step 67 of FIG. 5) is described. The central computer 20 receives the user account information from the mobile computing device 40 at block 72 and uses the supplied information at block 73 to determine whether the user has a valid account. If the central computer 20 does not authenticate/recognize the submitted user account information, the software application 47 initiates a temporary user account at block 74. This entails prompting the user to provide payment information in the exact amount of the requested print job. Once either the original or temporary user account information is verified by the central computer 20, the process proceeds to block 75 where a verification code containing at least the user cash balance and the unique identifier of record is sent from the central computer 20 to the software application 47. Next, at block 76, an additional security protocol is then initiated where the software application 47 queries the mobile computing device 40 to look up the unique identifier 48 and then checks the queried unique identifier 48 against the user's unique identifier of record sent from the central computer 20. If the verification is false, the account is deemed to be invalid, and the software application 47 shuts down and ends the transaction at block 77. If the verification is true, the account is valid, and the software application 47 proceeds with the print job at block 78.

Figure 7:
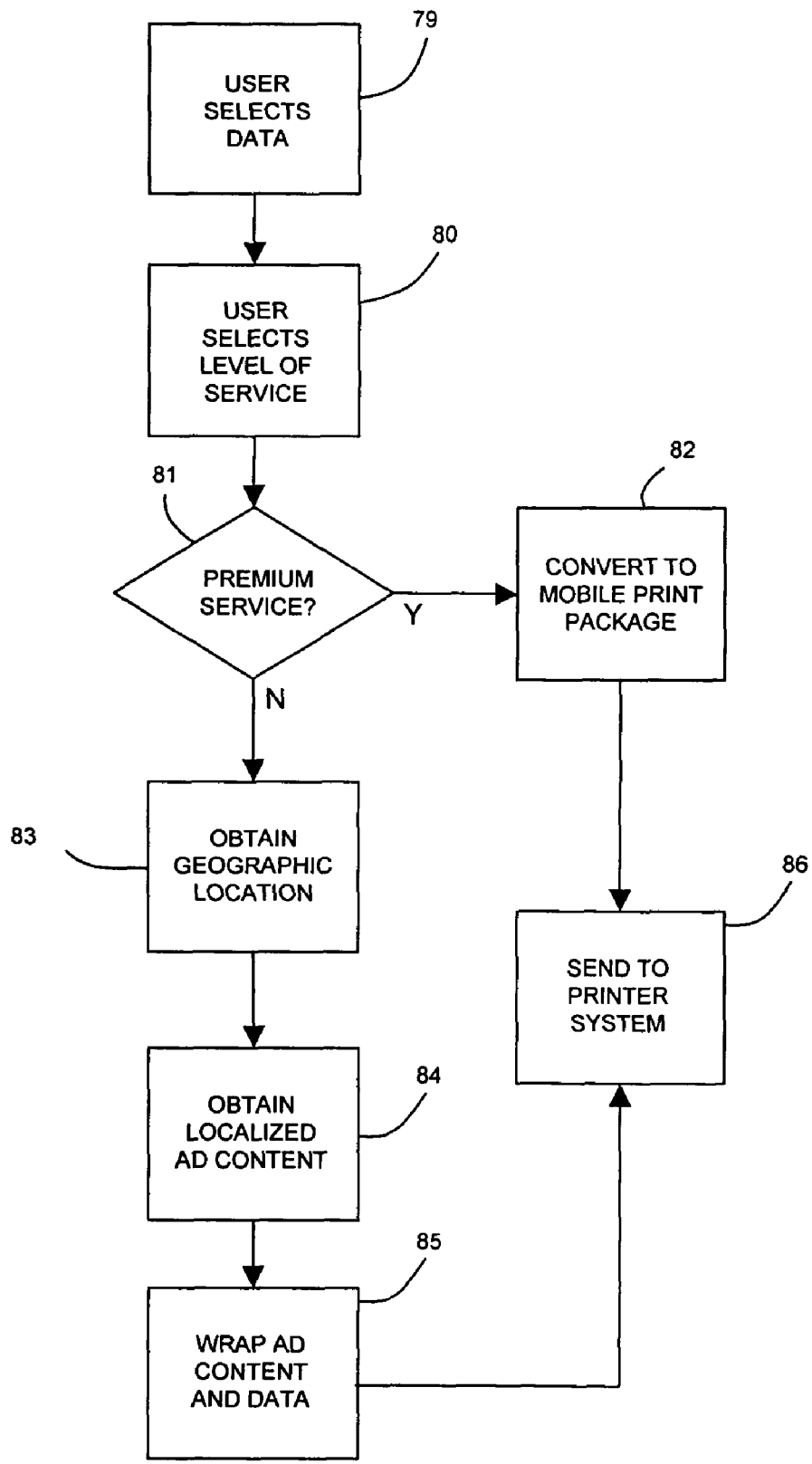
FIG. 7 is a flow chart representing a process for generating a mobile print package.

Turning now to FIG. 7, one process of generating a mobile print package (step 68 of FIG. 5) is described. First, at block 79, the user of the mobile computing device 40 selects a digital data stream to be printed and, at block 80, the user selects the desired level of service. Generally, users can be given the option of paying one fee for a "premium" level of service, in which case there will be no advertisement included in the final print output. Or, the user can opt to pay a lesser fee (which can include no fee at all), in which case there will be advertising included in the final print output. Next, at block 81, the software application 47 determines whether premium service has been selected. If premium service is selected, then the software application 47 uses the data stream, without advertisement content, to create the mobile print package at block 82. If premium service is not selected, then the software application 47 obtains geospatial information from the physical locator device 46 at block 83. At block 84, the software application 47 uses the geospatial information to obtain localized advertisement content from the localized advertisement content database 27 of the central computer 20 via the second wireless communication interface 44. The software application 47 wraps the localized advertisement content with the selected data stream to prepare the mobile print package at block 85. The mobile print package is sent to the printer system 50 at block 86.

Figure 8:
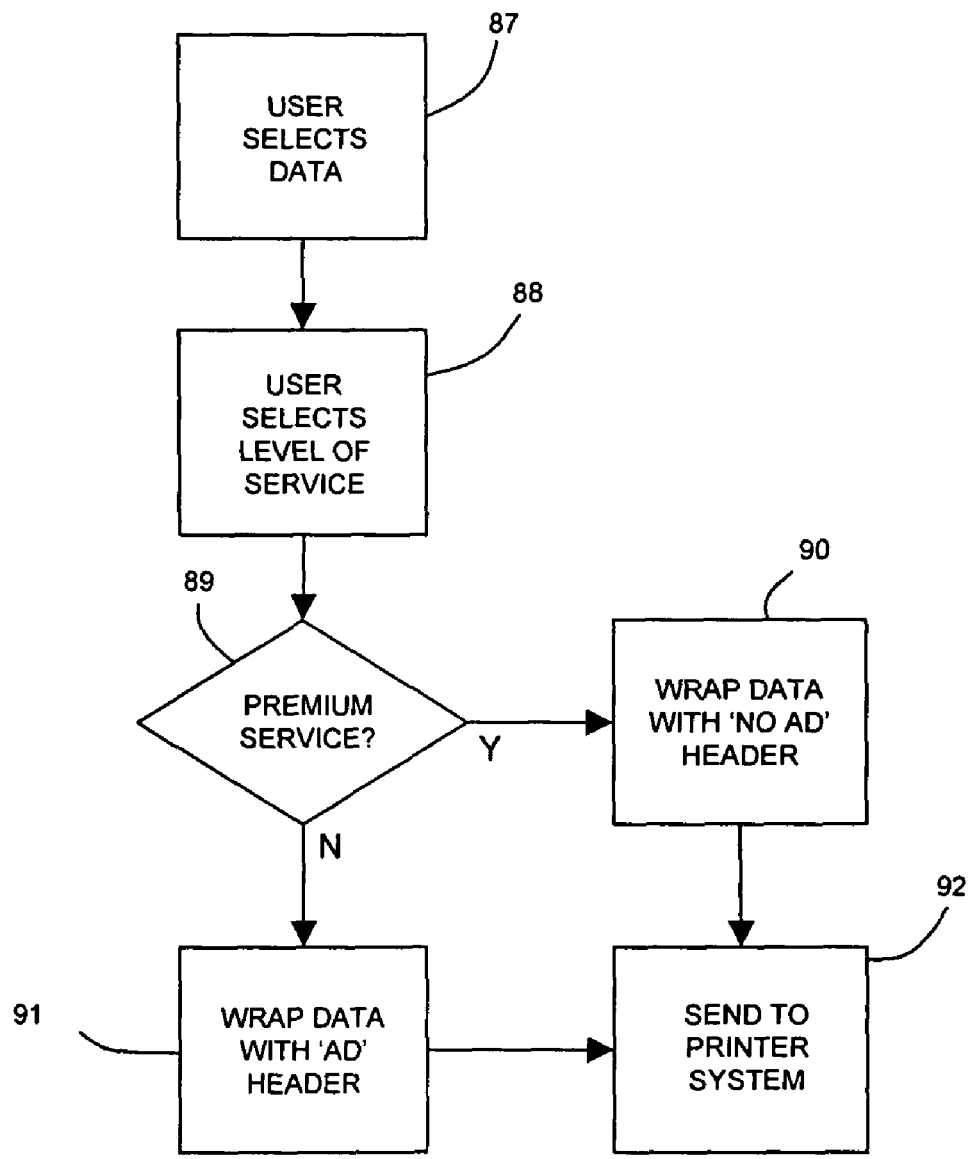
FIG. 8 is a flow chart representing an alternative process for generating a mobile print package.

Referring to FIG. 8, an alternative process of generating a mobile print package (step 68 of FIG. 5) is described. As in the process of FIG. 7, the user of the mobile computing device 40 first selects a digital data stream to be printed at block 87 and the desired level of service at block 88. Next, at block 89, the software application 47 determines whether premium service has been selected. If premium service is selected, then the software application 47 wraps a "no advertisement" header with the data stream to create the mobile print package at block 90. If premium service is not selected, then the software application 47 wraps an "advertisement" header with the data stream to create the mobile print package at block 91. The mobile print package is sent to the printer system 50 at block 92. If the mobile print package contains an "advertisement" header, the printer system 50 will then obtain localized advertisement content from the advertisement content memory 54 when printing the output document. If the mobile print package contains a "no advertisement" header, the printer system 50 will not obtain localized advertisement content from the advertisement content memory 54.

Figure 9:
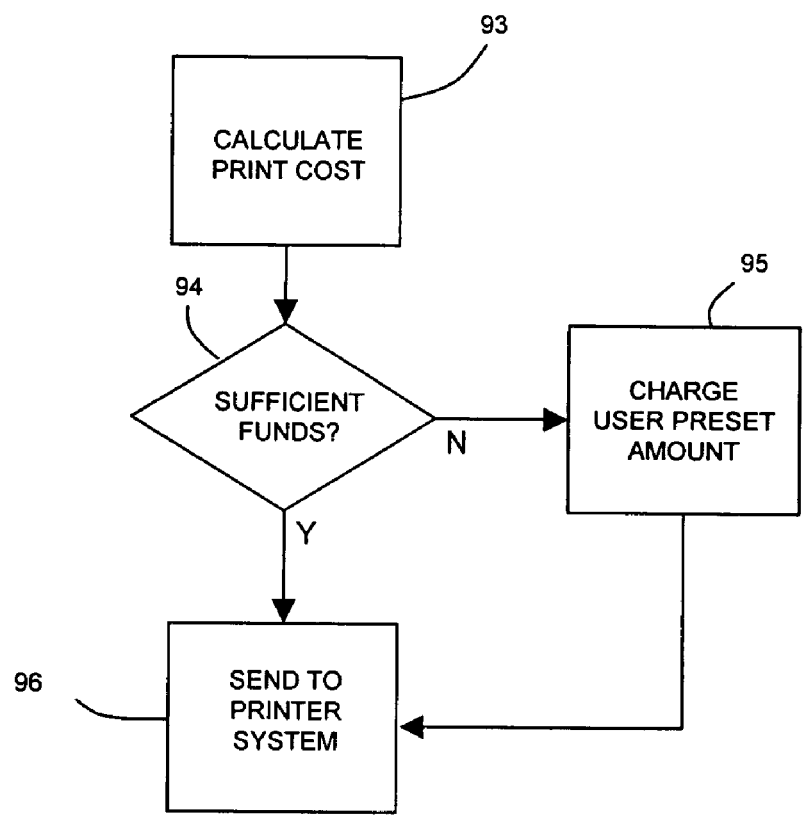
FIG. 9 is a flow chart representing a process for sending a mobile print package from a mobile computing device to a wireless printer system.

Referring to FIG. 9, one process by which the software application 47 sends a mobile print package to a wireless printer system 50 (step 69 of FIG. 5) is described. First, at block 93, the software application 47 calculates the cost of the requested print job using an algorithm based on any suitable basis for establishing cost, such as a cost-per-page or cost-per-kilobyte basis. The software application 47 then determines if the user has sufficient credit or cash balance to print the requested data stream at block 94. If the user does not have enough payment to cover the cost of printing the data stream, the software application 47 charges the user's account a preset amount, at block 95, to ensure there is adequate payment to cover the cost of the printing. This could include prompting the user to enter a credit card number before proceeding with the print request. As an alternative to charging the user for the cost of the print job, the software application 47 could terminate the transaction if the user does not have sufficient funds. If the user does have sufficient funds (or once the amount of the print request is sufficiently funded at block 95), the software application 47 sends the mobile print package to the printer system 50 via the short-range secure wireless connection established between the mobile computing device 40 and the wireless printer system 50 at block 96.

Figure 10:
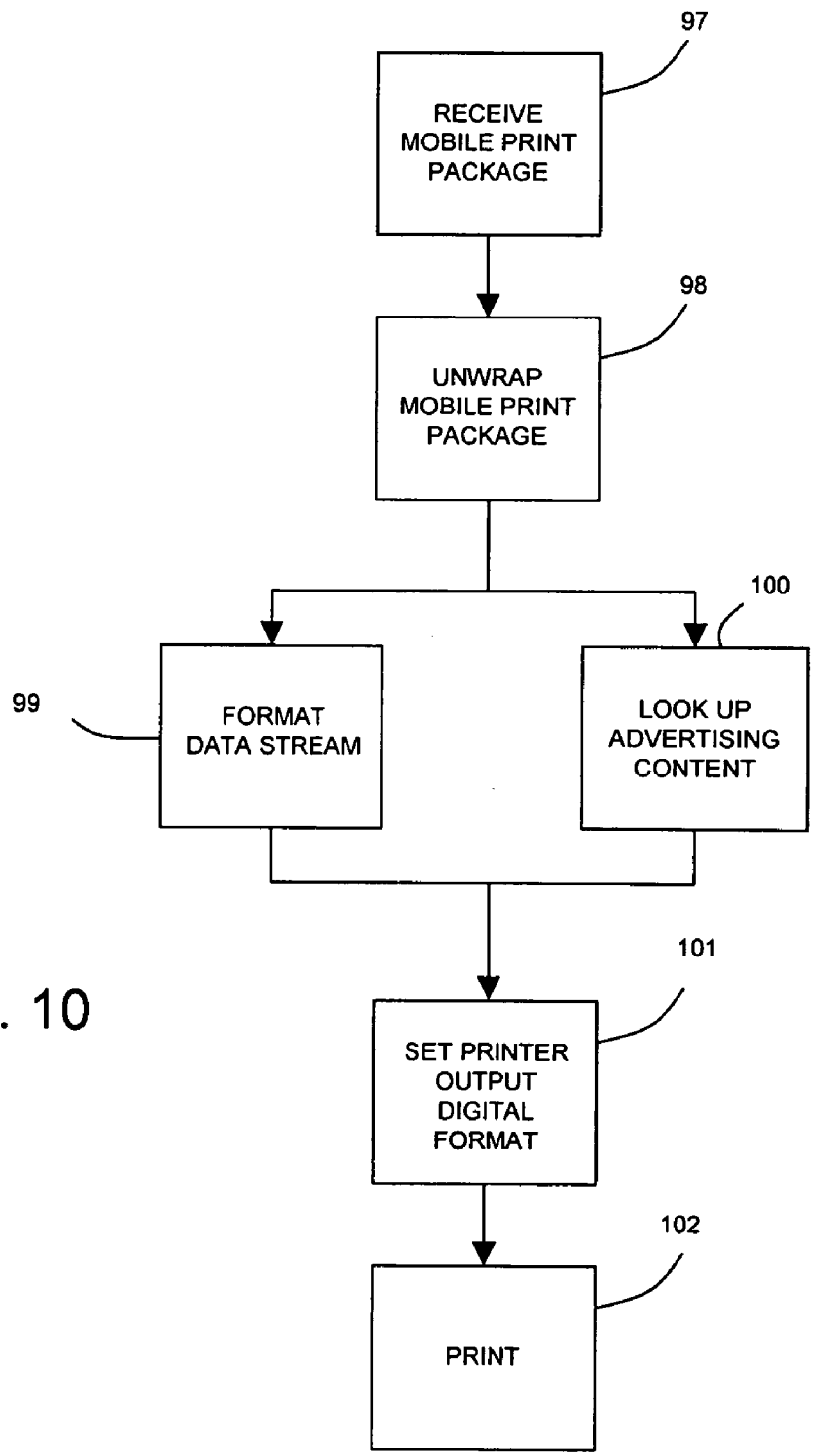
FIG. 10 is a flow chart representing a process by which a wireless printer system produces printed output.

Referring to FIG. 10, one process by which the wireless printer system 50 produces the printed output (steps 70 and 71 of FIG. 5) is depicted. This process begins at block 97 when the wireless printer system 50 receives the mobile print package from the mobile computing device 40. The integration software application 55 unwraps the mobile print package at block 98 into the original data components. From there, the integration software application 55 formats the data stream based on the file type of the user's data stream at block 99. In parallel, the integration software application 55 uses the geospatial information and the advertisement placement information contained in the mobile print package, if any, to look up advertisement content from the advertisement content memory 54 at block 100 (unless advertisement content has been previously obtained from the localized advertisement content database 27, as described above). The step of producing the digital format of the printer output occurs when the consumer product presentation layer 53 merges the user data stream and the localized advertisement, where appropriate (i.e., premium service not selected), at block 101 in the form which the printer unit 52 uses to produce the user paper copy of the data stream. This digital data is then printed by the printer unit 52 at block 102. Possible print formats for delivering the advertisement content with the printed data include: providing the advertisement content on a standard cover page that could also contain information regarding the print job, shrinking the print text and placing the advertisement content in the margins, and printing the advertisement content on coupons printed out at the end of the print job.

While specific embodiments of the present invention have been described, it should be noted that various modifications thereto can be made without departing from the spirit and scope of the invention as defined in the appended claims.

What is claimed is:

1. A method of using a mobile computing device to wirelessly print data, said method comprising:
   establishing a first wireless link between said mobile computing device and a printer system;
   establishing a second wireless link between said mobile computing device and a central computer system;
   transmitting user account data from said mobile computing device to said central computer system via said second wireless link;
   receiving a user verification code from said central computing system via said second wireless link;
   generating a mobile print package with said mobile computing device in response to receiving said user verification code, said mobile print package including data to be printed; and
   transmitting said mobile print package from said mobile computing device to said printer system via said first wireless link.

2. The method of claim 1 further comprising:
   receiving localized advertisement content from said central computer system via said second wireless link, said localized advertisement content being based on the current geographical location of said mobile computing device and/or said printer system; and
   packaging said localized advertisement content with said data to be printed when generating said mobile print package.

3. The method of claim 1 wherein generating a mobile print package comprises allowing a user to elect between a first level of service in which advertisement content is included in said mobile print package and a second level of service in which advertisement content is not included in said mobile print package.

4. The method of claim 3 wherein, if said user elects said first level of service, generating a mobile print package further comprises:
   determining the current geographical location of said mobile computing device and/or said printer system;
   obtaining localized advertisement content based on said geographical location; and
   packaging said localized advertisement content with said data to be printed.

5. The method of claim 3 wherein, if said user elects said first level of service, generating a mobile print package further comprises wrapping a header with said data to be printed, wherein said header instructs said printer system to include localized advertisement content.

6. The method of claim 1 further comprising:
   calculating a print cost for said mobile print package; and
   determining whether sufficient funds are available to print said mobile print package.

7. The method of claim 1 wherein generating a mobile print package further comprises wrapping a header with said data to be printed, wherein said header instructs said printer system to include localized advertisement content.

8. The method of claim 1 wherein generating a mobile print package comprises:
   obtaining geospatial information from a physical locator device associated with said mobile computing device;
   using said geospatial information to determine the current geographical location of said mobile computing device;
   obtaining localized advertisement content based on said geographical location; and
   packaging said localized advertisement content with data to be printed.

9. The method of claim 1 wherein generating a mobile print package comprises:
   obtaining geospatial information from a physical locator device associated with said printer system;
   using said geospatial information to determine the current geographical location of said printer system;
   obtaining localized advertisement content based on said geographical location; and
   packaging said localized advertisement content with data to be printed.

10. A computer-readable medium containing instructions for controlling a mobile computing device to perform a method of wirelessly printing data, wherein said method comprises:
    establishing a first wireless link between said mobile computing device and a printer system;
    establishing a second wireless link between said mobile computing device and a central computer system;
    transmitting user account data from said mobile computing device to said central computer system via said second wireless link;
    receiving a user verification code from said central computing system via said second wireless link;
    generating a mobile print package with said mobile computing device in response to receiving said user verification code, said mobile print package including data to be printed; and
    transmitting said mobile print package from said mobile computing device to said printer system via said first wireless link.

11. The computer-readable medium of claim 10 wherein generating a mobile print package comprises allowing a user to elect between a first level of service in which advertisement content is included in said mobile print package and a second level of service in which advertisement content is not included in said mobile print package.

12. The computer-readable medium of claim 11 wherein, if said user elects said first level of service, generating a mobile print package further comprises:
    determining the current geographical location of said mobile computing device and/or said printer system;
    obtaining localized advertisement content based on said geographical location; and
    packaging said localized advertisement content with said data to be printed.

13. The computer-readable medium of claim 11 wherein, if said user elects said first level of service, generating a mobile print package further comprises wrapping a header with said data to be printed, wherein said header instructs said printer system to include localized advertisement content.

14. The computer-readable medium of claim 10 wherein said method further comprises:
    calculating a print cost for said mobile print package; and
    determining whether sufficient funds are available to print said mobile print package.

15. The computer-readable medium of claim 10 wherein generating a mobile print package further comprises wrapping a header with said data to be printed, wherein said header instructs said printer system to include localized advertisement content.

16. A system for printing a data stream originating from a mobile computing device, said system comprising:
    a database of geo-spatial based, localized advertisement content;
    a plurality of printer systems, each printer system including means for establishing a first wireless link with said mobile computing device and means for printing a data stream received from said mobile computing device and localized advertisement content from said database that is based on the current geographical location of said mobile computing device and/or said printer system; and
    a central computer system including means for establishing a second wireless link with said mobile computing device, means for receiving user account data from said mobile computing device via said second wireless link, and means for transmitting a user verification code to said mobile computing device via said second wireless link so that said mobile computing device can generate a mobile print package in response to receiving said user verification code.

17. The system of claim 16 wherein said database is associated with said central computer system.

18. The system of claim 16 further comprising additional databases of geo-spatial based, localized advertisement content, and wherein each database is associated with a corresponding one of said printer systems.

19. A method of using a mobile computing device to wirelessly print data, said method comprising:
    establishing a first wireless link between said mobile computing device and a printer system;
    establishing a second wireless link between said mobile computing device and a central computer system;
    determining the current geographical location of said mobile computing device and/or said printer system;
    receiving localized advertisement content from said central computer system via said second wireless link, wherein said localized advertisement content is based on said geographical location;
    transmitting user account data from said mobile computing device to said central computer system via said second wireless link;
    receiving a user verification code from said central computing system via said second wireless link;
    generating a mobile print package with said mobile computing device in response to receiving said user verification code, said mobile print package including data to be printed and said localized advertisement content; and
    transmitting said mobile print package from said mobile computing device to said printer system via said first wireless link.

20. A method of using a mobile computing device to wirelessly print data, said method comprising:
    establishing a first wireless link between said mobile computing device and a printer system;
    establishing a second wireless link between said mobile computing device and a central computer system;

transmitting user account data from said mobile computing device to said central computer system via said second wireless link;

receiving a user verification code from said central computing system via said second wireless link;

generating a mobile print package in response to receiving said user verification code, said mobile print package including data to be printed and a header that instructs said printer system to include localized advertisement content; and transmitting said mobile print package from said mobile computing device to said printer system via said first wireless link.

\* \* \* \* \*